Feb. 28, 1950  T. W. W. FORREST  2,498,949
PROCESS FOR SEEDING AND CAP STEMMING RAISINS
Filed May 12, 1945
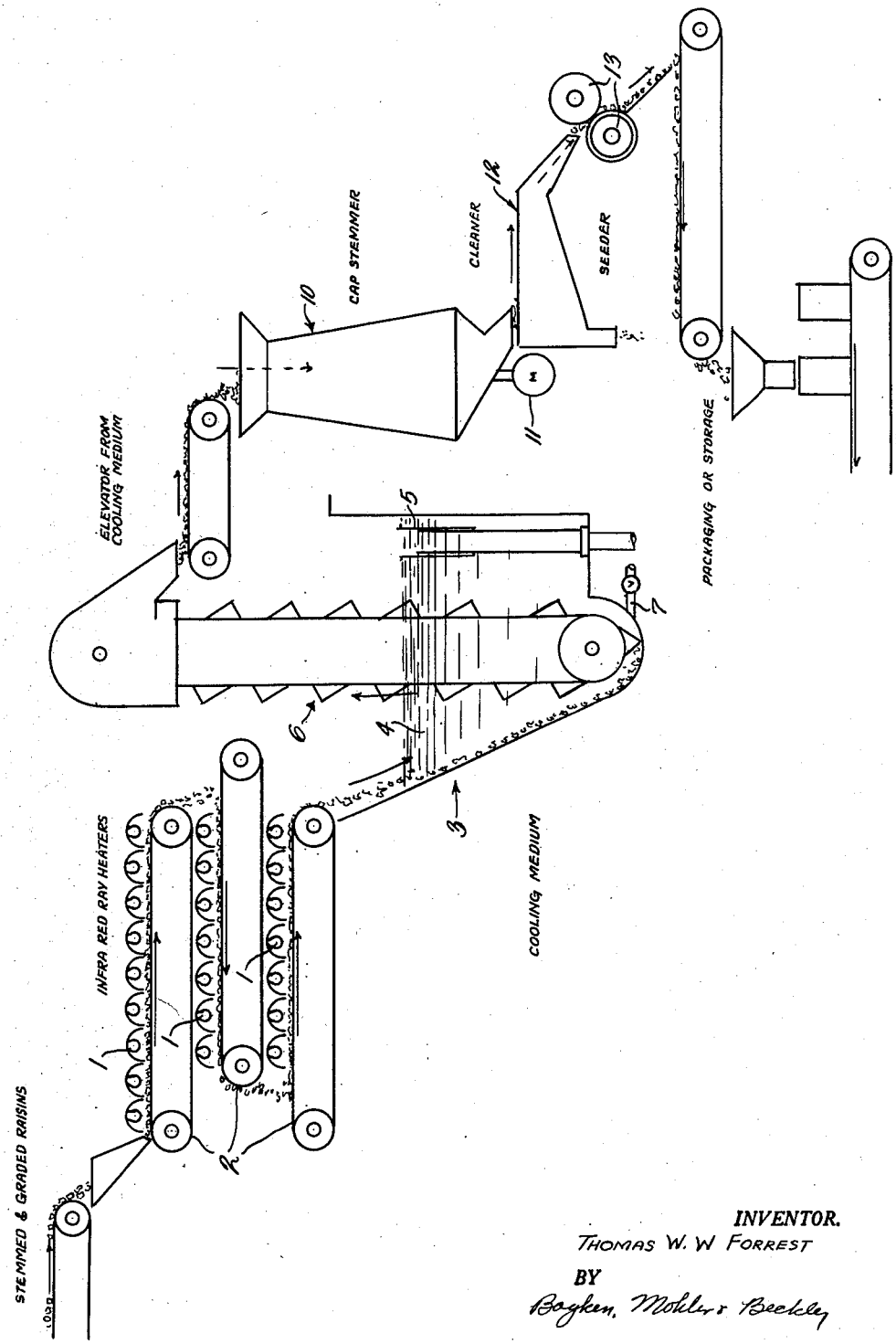
INVENTOR.
THOMAS W. W FORREST
BY
ATTORNEYS Patented Feb. 28, 1950

2,498,949

UNITED STATES PATENT OFFICE 2,498,949

PROCESS FOR SEEDING AND CAP STEMMING RAISINS

Thomas W. W. Forrest, Fresno, Calif., assignor to Fewel Bros. Packing Co., Fresno, Calif., a co-partnership composed of Richard W. Fewel and Alan J. Fewel Application May 12, 1945, Serial No. 593,435

6 Claims. (Cl. 146—227)

This invention relates to a process for treating raisins prior to seeding and has for one of its objects the production of raisins that are superior to those treated by present conventional methods and at a great saving in time and expense.

Another object of the invention is an improved treatment for raisins preparatory to seeding whereby the seeds are easier to remove than heretofore, thereby resulting in a cleaner removal with less mutilation of the raisins.

Other objects and advantages will appear in the description and claims.

Heretofore the processing of raisins between the stemming and grading steps and the seeding step has been from about eight to twenty-four hours, according to the character of the raisins, and the resulting raisins have broken down skins as well as objectionable adherence between the meat and the seeds with the result that the seeding operation mutilates the raisins to an objectionable degree and there is a loss of desirable tissue that clings to the seeds and is removed with them. Also raisins treated by conventional processes are dead in appearance with a white or grayish cast from surface crystalization of sugars.

By means of the process hereinafter disclosed, the time of processing between the stemmer and seeder is a small fraction of the time now required, and the resultant raisins are glossy and plump as compared with raisins treated by conventional methods, and said raisins are relatively uniform discrete bodies that show no tendency toward crystalization of sugars therein. The seeds are cleanly and easily removed with less solids adhering thereto than heretofore and apparently the objectionable cracking and breaking of raisins by conventional methods prior to seeding is eliminated by this invention.

The drawing is purely diagrammatic and is illustrative of the present process. The cap stemmer, cleaner and seeder are all conventional devices now employed for these purposes.

In detail, the raisins such as stemmed and graded natural muscat raisins having a moisture content of say between 16% and 17% by weight are first carried below infra red heating lamps 1 on conveyors 2, the said lamps being so staggered and arranged with respect to the raisins on the conveyors as to eliminate shadows and to subject the raisins to uniform heat. The discharge of the raisins from one conveyor to the other tumbles the raisins so as to present different sides to the lamps, although any other apparatus that will provide heat of the same character is suitable.

It is particularly important that the heating of the raisins be discontinued as soon as their temperature is about 165° F. or say between about 158° F. and 165° F. There is no actual drying of the raisins by this heating step, or if so, it is so small as to be negligible. At about 165° F. the sugars will commence caramelization, while at about 158° F. there is substantially no such action. The fact that there is no noticeable or substantial drying by the infra red ray heaters is important.

As soon as the temperature of the raisins is between about 158° F. and 165° F. they are passed through a cooler 3, which in this case is a body of temperature controlled water 4 that may be maintained at about 70° F., and the inside temperature of the raisins is reduced in this cooler to about 125° F., although the outside may be substantially below 125° F. The time the raisins are in this water may be regulated by the speed of the elevator 6 and the height of the water 4. This height may be reduced or increased by lowering or raising overflow pipe 5. Thus the higher the level of water (assuming the speed of the elevator is constant) the longer the raisins will be in the water, and the lower the level, the shorter the time. Tap water is generally suitable, and a contant flow of water into the cooler through pipe 7 will maintain the temperature of the water substantially uniform.

The average temperature of the raisins may be about 100° F. to 110° F. upon leaving the water 4, and where said water is at about 70° F. or between 65° and 75° F., the temperature of the raisins at about 165° F. when introduced into said water is lowered to an average of from about 100° to 110° within from about one-fourth to one-half minute.

The raisins removed from the water are practically immediately fed into the capper 10 where they are rolled between concentric tubular members, the inner of which may be rotated by motor 11. The caps are loosened and separated from the raisins in this step, and cleaning of the stems from the raisins may be accomplished in cleaner 12 from which the raisins are delivered to the seeder rolls 13 where they are slit open and the seeds removed, a slight compression of the raisins occurring at the same time.

There is still some heat that was acquired at the heater in said raisins when seeded, but the opening of the raisins by the seeder results in a rapid removal of this heat until the hottest temperature is between about 80° F. and 90° F. which is a suitable temperature for packaging, and which packaging step may come after the seeding. At this time the raisins are not sticky and are discrete, relatively plump bodies that are glossy and appetizing in appearance without the addtion of oil or any other medium.

An example of raisins conventionally treated and treated by the present process insofar as moisture content is concerned, is as follows:

*Moisture (vacuum oven at 70° C.)*

| | Per cent |
|---|---|
| Natural Muscat raisins before treatment | 16.63 |
| Natural Muscat raisins conventionally treated | 10.86 |
| Natural Muscat raisins treated by this invention | 16.24 |

This retention of moisture content is highly desirable, but the employment of conventional methods involves unavoidable loss as shown in the above figures. The raisins should be relatively soft, plump, and glossy, and they should have a "live" color, instead of the stale, dead, grayish appearance that comes from excessive drying and the crystallization of sugar. All these desirable characteristics are found in raisins treated by the above described process, and the time of treatment by this process is a matter of minutes as compared with from eight to twenty-four hours by the conventional processes.

While the temperature of the raisins heated by the infra red rays is preferably from about 158° F. to about 165° F., and while their average temperature is reduced from about 160° F., or the above temperatures, to about 100° or 110° F. for stemming, it must be understood that there may be some variations in these temperatures, although for the most satisfactory results from all points of view, the temperatures given are the preferable ones. The cap stemming operation appears to be better where skin temperature is about 80° to 90° F. and the seeding operation appears to be better where the temperature around the seeds may be about 100° to 110° F.

The characteristics of the raisins treated by the process above described are different from raisins treated in the ordinary manner. A conventional seeder comprises saws and flickers. The raisins are pressed into the seeder saws and are flattened, and are then ejected from the saws by the flickers. Raisins treated by usual processes hertofore practiced are "dead" or "lifeless" and when flattened in the seeding operation they remain flattened and are subjected to rolling in screens in an attempt to restore their shapes. This rolling makes the raisins dirty and sticky, and they are still "dead" even though filled out somewhat.

The raisins treated by my process are resilient, and after being flattened in the seeders they automatically expand again to more nearly the shape of the original raisin, before flattening, than to the flattened shape.

The dipping of the raisins in water casehardens them whereby the immediate cap stemming is necessary before the interior heat comes to the surface, and this heat is then utilized to facilitate the seeding operation, inasmuch as the seeds are removed more readily and cleanly while there is still heat in the product.

Thus one of the important steps in the process is the case hardening of the raisins or skin cooling thereof by dipping in liquid, and thereafter the removal of the cap stems and seeds while the insides of the raisins are still at a temperature elevated above that of their skins.

I claim:

1. The process of treating raisins for seeding that comprises the steps of heating the raisins to between about 158° F. and 165° F. substantially free from the removal of moisture therefrom, then reducing the temperature of the raisins to about 125° F. by passing them through relatively cool water, and thereafter removing the caps and seeds from said raisins.

2. The process of treating raisins for seeeding that comprises the steps of subjecting the raisins to the influence of infra red rays until their temperature is between about 158° F. and about 165° F., immediately thereafter reducing the inside temperature of the raisin to about 125° F. by immersing the raisins in water of a lower temperature until their said inside temperature is about 125° F. then capping and seeding the raisins while their inside temperature is above that of the atmosphere.

3. The process of treating raisins that comprises the steps of subjecting natural muscat raisins to the influence of artificially produced infra red rays until their average temperature is about 160° F., then moving said raisins through water having a temperature of from about 65° F. to about 75° F. until their temperature around the seeds is about 125° F. and their skin temperature is about 80° to 90° F., then successively removing the caps and stems from said raisins.

4. The process of treating raisins that comprises the steps of subjecting natural muscat raisins to the influence of artificially produced infra red rays until their average temperature is about 160° F., then moving said raisins through water having a temperature of from about 65° F. to about 75° F. until their temperature around the seeds is about 125° F. and their skin temperature is about 80° to 90° F., then successively removing the caps and stems from said raisins while they still retain some of the heat from said rays.

5. The process that comprises the steps of case hardening raisins by heating them throughout their bodies to a substantially uniform predetermined temperature of almost the caramelization temperature of the natural sugar therein and then dipping them into a liquid of a cooler temperature of from about 65° F. to about 75° F. until the skins are cooled to a temperature below that of the interiors of the raisins, and thereafter removing the cap stems while the said skins are cooler than said interiors.

6. The process that comprises the steps of case hardening raisins by heating them throughout their bodies to a substantially uniform predetermined temperature of almost the caramelization temperature of the natural sugar therein and then dipping them into a liquid of a cooler temperature of from about 65° F. to about 75° F. until the skins are cooled to a temperature below that of the interiors of the raisins, and thereafter removing the cap stems while the said skins are cooler than said interiors, and then seeding said raisins before the dissipation of the said heat within said raisins.

THOMAS W. W. FORREST.

(References on following page)

REFERENCES CITED

The following references are of record in the file of this patent:

UNITED STATES PATENTS

| Number | Name | Date |
|---|---|---|
| 611,782 | Forsyth | Oct. 4, 1898 |
| 1,935,951 | Payne et al. | Nov. 21, 1933 |
| 2,032,406 | Forrest | Mar. 3, 1936 |
| 2,292,255 | Weisberg | Aug. 4, 1942 |

OTHER REFERENCES

"Commercial Fruit and Vegetable Products, by W. V. Cruess, 1st edition, published by McGraw-Hill Book Co. Inc., New York city in 1924. Page 426.